United States Patent
Tanabe

(10) Patent No.: US 7,351,922 B2
(45) Date of Patent: Apr. 1, 2008

(54) TOUCH PANEL AND THE MANUFACTURING METHOD

(75) Inventor: Koji Tanabe, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 142 days.

(21) Appl. No.: 11/191,798

(22) Filed: Jul. 27, 2005

(65) Prior Publication Data

US 2006/0044284 A1    Mar. 2, 2006

(30) Foreign Application Priority Data

Sep. 2, 2004  (JP)  ............................. 2004-255210

(51) Int. Cl.
*H01H 13/70*    (2006.01)
(52) U.S. Cl. ....................... 200/5 A; 200/512
(58) Field of Classification Search ................ 200/5 A, 200/5 R, 511, 512, 310, 314; 345/173–176; 178/18.01–6; 341/20, 22, 33, 34
See application file for complete search history.

(56) References Cited

U.S. PATENT DOCUMENTS

| | | | | |
|---|---|---|---|---|
| 4,786,767 A | * | 11/1988 | Kuhlman | 200/5 A |
| 4,958,148 A | * | 9/1990 | Olson | 200/5 A |
| 6,380,497 B1 | * | 4/2002 | Hashimoto et al. | 200/5 A |
| 6,677,542 B2 | * | 1/2004 | Katakami | 200/5 A |
| 6,777,631 B2 | * | 8/2004 | Muraoka et al. | 200/512 |
| 6,831,241 B2 | * | 12/2004 | Fukui et al. | 200/512 |
| 2003/0201155 A1 | * | 10/2003 | Katakami | 200/5 A |

FOREIGN PATENT DOCUMENTS

JP    2003-280821 A    10/2003

* cited by examiner

*Primary Examiner*—Elvin Enad
(74) *Attorney, Agent, or Firm*—RatnerPrestia

(57) ABSTRACT

A touch panel uses a plurality of spacers shaped in the form of a letter L. The L-shape spacers can be manufactured by densely patterning the shapes of L in a certain specific orientation on a spacer sheet. Thus, a large number of such spacers can be made available out of a unit spacer sheet of a certain specific size, at a lowered rate of loss in the material utilization.

2 Claims, 5 Drawing Sheets

TOUCH PANEL AND THE MANUFACTURING METHOD

FIELD OF THE INVENTION

The present invention relates to a touch panel for use in various types of electronic apparatus and a method of manufacturing the touch panel.

BACKGROUND ART

An increasing number of portable telephone units, car navigation devices and the like electronic apparatus are mounted with a light transmitting touch panel disposed at the front of a liquid crystal display panel or other display devices. Symbols and letters exhibited on the display panel can be seen through the touch panel; an operator may select and designate a specific symbol or a letter among those shown on the display panel. The operator can switch the operation of an apparatus from one function to another by pressing the touch panel with the finger or a dedicated pen at a certain specific place representing the desired function. The touch panels for use in such applications are typically required to be easy to manufacture and inexpensive.

A conventional touch panel is described with reference to FIG. 5 and FIG. 6.

For the purpose of making a clear presentation of the structural concepts, the cross sectional drawings in FIG. 5 and FIG. 6 have been shown magnified in the direction of panel thickness.

FIG. 5 is a cross sectional view which shows a conventional touch panel. In FIG. 5, light transmitting lower substrate 51 is provided at the upper surface with lower conductive layer 53 formed of indium tin oxide or other light transmitting material, while upper substrate 52 which is a light transmitting film is provided at the lower surface with upper conductive layer 54.

On the upper surface of lower conductive layer 53, dot spacers (not shown) made of an insulating resin material are disposed at a certain specific interval. A pair of upper electrodes (not shown) is provided at both sides of upper conductive layer 54, while a pair of lower electrodes (not shown) is provided at both sides of lower conductive layer 53 in the direction perpendicular to the upper electrodes.

Upper substrate 52 and lower substrate 51 are disposed so that upper conductive layer 54 and lower conductive layer 53 oppose face to face. The two substrates are coupled together with a certain specific clearance in-between using spacer 55, which spacer having the shape of a picture frame and provided at the upper surface and the lower surface with adhesive layer 56A, 56B. A finished touch panel is structured in such configuration.

FIG. 6A is a plan view of touch panels on the production line, while FIG. 6B and FIG. 6C show the cross sectional views at their production process. In the first place, adhesive layers 56A and 56B are provided, and upper release sheet 57A and lower release sheet 57B are attached to the upper surface of adhesive layer 56A and the lower surface of adhesive layer 56B, respectively. Sandwiched between them is spacer sheet 58 provided in a belt form. Out of the above material thus prepared, finished spacer 55 is obtained by cutting out spacer portion 58A, or the portion hatched to the shape of a picture frame.

Then, as shown in the cross sectional view, FIG. 6C, upper release sheet 57A and lower release sheet 57B are peeled off to have adhesive layers 56A and 56B exposed. Upper substrate 52 and lower substrate 51 are coupled together by means of spacer 55 along the circumference. Thus, a finished touch panel is provided.

A finished touch panel is disposed at the front of a liquid crystal display or other display devices to be mounted integrally on an electronic apparatus. The pair of the upper electrode and the lower electrode is connected to an electronic circuit (not shown) of the electronic apparatus.

In the above described setup, when an operator watching the display screen presses the upper surface of upper substrate 52 with the finger or a pen, upper substrate 52 is deformed bringing upper conductive layer 54 to make contact with lower conductive layer 53 at the pressed location. A voltage is applied to the upper electrode and to the lower electrode from the electronic circuit, and the electronic circuit acknowledges the pressed location by detecting the voltage ratio between the electrodes. In this way, an operator can switch the operation of the apparatus from one function to another.

Japanese Patent Unexamined Publication No. 2003-280821 is a known prior art related to the present invention.

However, spacer 55 having a picture frame shape which is used for coupling upper substrate 52 and lower substrate 51 together in the above-configured conventional touch panels is provided by making use of spacer sheet 58 only at spacer portion 58A; with the rest of the spacer sheet 58 areas, viz. inner region 58B and outer region 58C of the picture frame, left unused. The wasteful areas account for a substantial square measure as compared to that actually used for spacer 55, as shown in FIG. 6A. As a result, spacer 55 can be made available to the extent that spacer sheet 58 is used. Poor utilization rate of the material, or spacer sheet 58, in the conventional configuration has led to a problem of high cost with the touch panels.

SUMMARY OF THE INVENTION

A touch panel includes a plurality of spacers shaped in the form of a letter L. Each of the spacers is provided at the upper surface and the lower surface with an adhesive layer; which spacers are disposed between the upper and the lower substrates along the circumferential sides in an opposing arrangement. The L-shape spacers can be made available for large numbers out of a unit spacer sheet of a certain specific size.

DETAILED DESCRIPTION OF THE INVENTION

An exemplary embodiment of the present invention is described in the following, referring to FIG. 1 through FIG. 4.

The cross sectional views in FIG. 1 through FIG. 4 have been shown magnified in the thickness direction for a clearer presentation of the touch panel structure. Those portions of the structure in the present embodiment identical to those described earlier in the Background Art are designated with the use of identical symbols, and descriptions on such portions have been simplified.

Exemplary Embodiment

Figure 1:
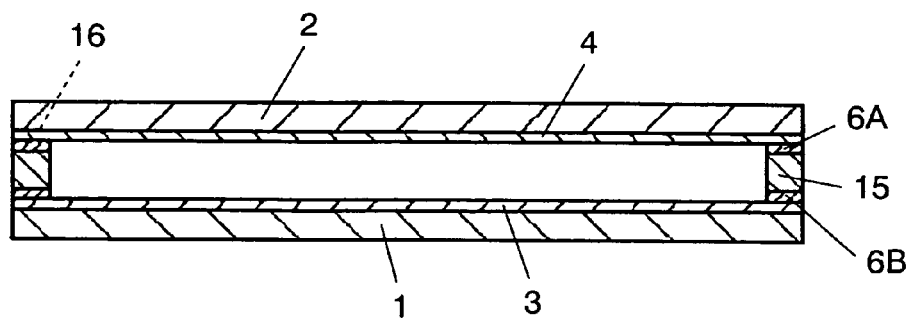
FIG. 1 is a cross sectional view of a touch panel in accordance with an exemplary embodiment of the present invention.
Figure 2:
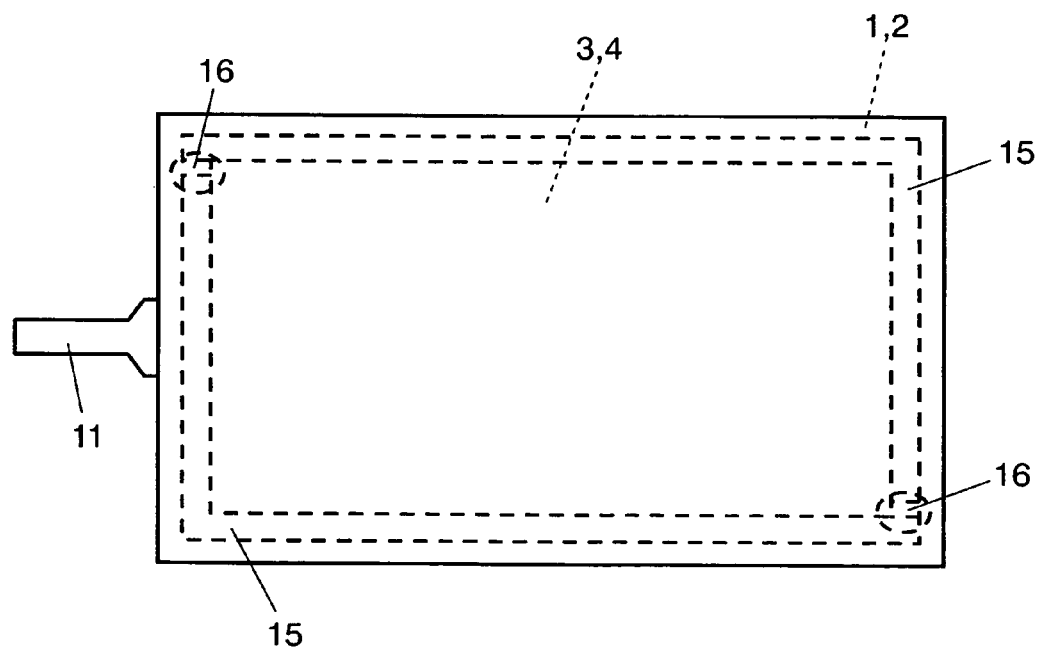
FIG. 2 is a plan view of a touch panel in accordance with an exemplary embodiment of the present invention.

FIG. 1 is a cross sectional view showing a touch panel in accordance with an exemplary embodiment of the present invention; FIG. 2 the plan view.

Referring to FIG. 1, lower substrate 1 is made of a light transmitting material such as a glass, acrylic resin, polycarbonate resin, etc. Upper substrate 2 is formed of a light transmitting film of polyethylene terephthalete, polycarbonate resin, etc. Provided on the upper surface of lower substrate 1 is lower conductive layer 3 formed of indium tin oxide, tin oxide or other light transmitting materials. Likewise, upper substrate 2 is provided at the lower surface with upper conductive layer 4 formed through a spattering or the like process.

On the upper surface of lower conductive layer 3, a plurality of dot spacers (not shown) made of an insulating resin such as an epoxy, silicone, etc. is provided at a certain specific interval. At both sides of upper conductive layer 4, a pair of upper electrodes (not shown) is provided using silver, carbon or the like material; while a pair of lower electrodes (not shown) is provided at both sides of lower conductive layer 3 in the direction perpendicular to the upper electrodes.

Referring to FIG. 2, L-shaped spacer 15 is made with a non-woven fabric, a polyester film or other materials. A first spacer 15 is disposed between upper substrate 2 and lower substrate 1 along the left-to-bottom circumferential sides. A second spacer 15 is also disposed along the right-to-top circumferential sides in an opposing layout. Upper conductive layer 4 and lower conductive layer 3 are coupled together by these spacers, with a certain specific clearance in between the layers. The layers 4 and 3 are glued tight to each spacer 15 via respective adhesive layers 6A and 6B formed of an acrylic resin, a rubber or other materials.

On the upper and the lower surfaces of wiring substrate 11 made with a polyethylene terephthalete film, a polycarbonate film, etc., a plurality of wiring patterns (not shown) is formed with silver, carbon, a copper foil or other materials. The wiring patterns are connected with the upper and the lower electrodes. Further, the gaps between the two spacers 15 at the left top and right bottom corners are sealed with sealing material 16 of epoxy, an acrylic resin, olefin, etc.

Now in the following, methods for manufacturing the above-described spacer 15 and a touch panel are described.

FIG. 3 shows a plan view and cross sectional views used to describe a method for manufacturing a touch panel in accordance with an exemplary embodiment of the present invention.

Figure 3A:
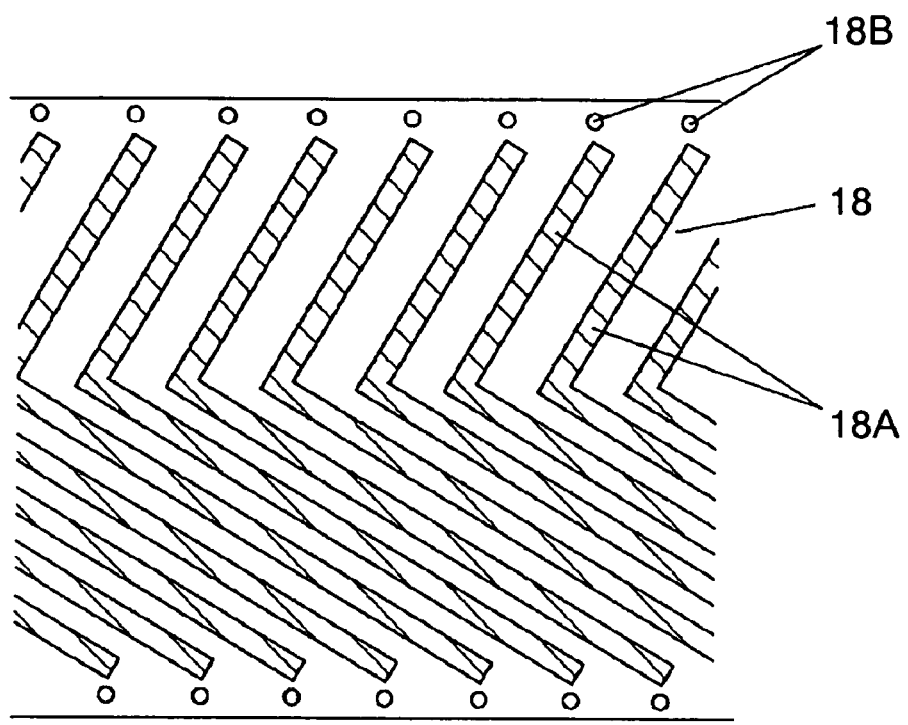
FIGS. 3A, 3B and 3C show a plan view and cross sectional views used to describe a method for manufacturing a touch panel in accordance with an embodiment of the present invention.
Figure 3B:
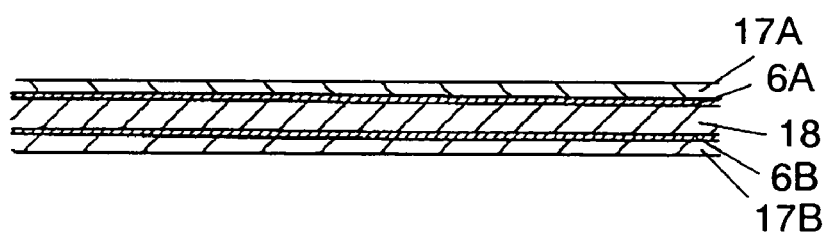
Figure 3C:
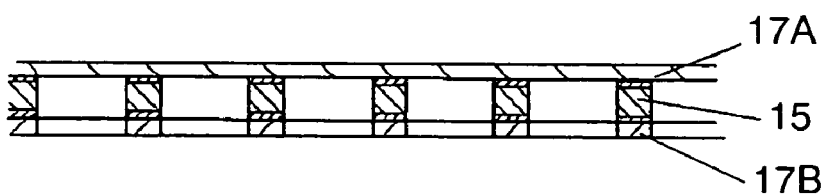

As illustrated in the plan view, FIG. 3A, and the cross sectional view, FIG. 3B, spacer sheet 18 is provided at the upper surface and the lower surface with adhesive layer 6A and adhesive layer 6B, respectively. Then, upper release sheet 17A and lower release sheet 17B are attached, respectively, on the upper surface of adhesive layer 6A and the lower surface of adhesive layer 6B. The release sheets are made of a paper, polyethylene terephthalete, etc. Spacer sheet 18 in a belt form, which is provided with perforations 18B disposed at a certain interval along both sides, undergoes a half-cutting process applied from the bottom, leaving upper release sheet 17A as it is.

The half-cut processing is for generating a pattern representing a plurality of L-shape spacer portions 18A, as shown hatched in FIG. 3A. And then, when portions of spacer sheet 18 and lower release sheet 17B not included in the hatched area of spacer portion 18A are removed, one will find a plurality of L-shape spacers 15 orientated in the left-right direction sticking on upper release sheet 17A as shown in the cross sectional view, FIG. 3C.

Namely, spacer 15 is shaped in the form of a letter L and it is patterned for substantial numbers on spacer sheet 18. Since a plurality of spacers 15 can be patterned on spacer sheet 18 at a high density with only a small distance among each other, quite a number of spacers 15 can be made available out of a unit of spacer sheet 18 having a certain size. Thus, the material loss can be reduced to a minimum for an improved efficiency of utilization.

Spacers 15 in FIG. 3A are shown with the mutual distance enlarged, for the purpose of clearer presentation of the structural concept. In the actual production of a plurality of spacers 15 by taking advantage of the above-described half-cutting procedure, much more spacers 15 may be patterned at a shorter mutual distance between the spacers; a distance corresponding to the thickness of a cutting knife would be sufficient.

FIG. 4 shows cross sectional views used to describe a method for manufacturing a touch panel in accordance with an embodiment of the present invention.

Figure 4A:
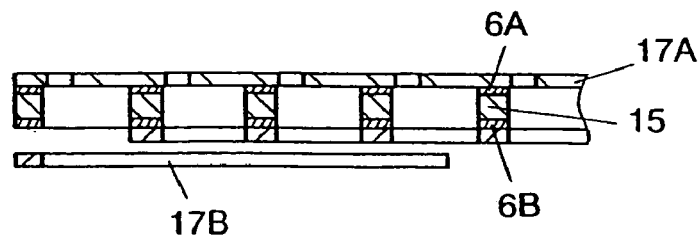
FIGS. 4A, 4B, 4C and 4D show other cross sectional views used to describe a method for manufacturing a touch panel in accordance with an embodiment of the present invention.
Figure 4B:
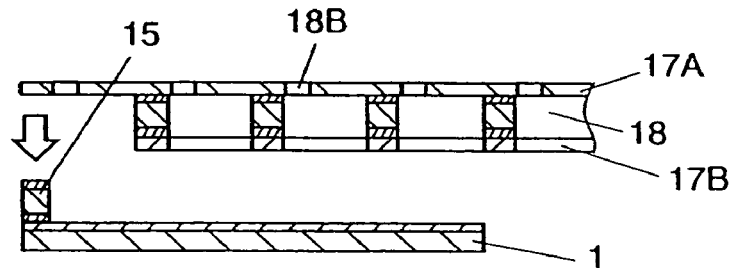

As shown in the cross sectional view, FIG. 4A, lower release sheet 17B is removed from one spacer 15 which is located, for example, at the left-most among the plurality of spacers, to have its lower adhesive layer 6B exposed. Then, as shown in FIG. 4B, spacer 15 is put on lower substrate 1 at the upper surface, which substrate is being held by a certain specific assembly jig (not shown) so that spacer 15 is attached in parallel with the left-to-bottom circumferential sides, for example. If the jig holding lower substrate 1 is provided with a pin to be inserted into perforation 18B of spacer sheet 18 during the above procedure, spacer 15 may be attached precisely at a specified location of lower substrate 1 without positioning errors.

Furthermore, if the peel strength is made to be different between upper release sheet 17A and lower release sheet 17B by differentiating the type and/or thickness of silicone, etc. applied onto the lower surface of upper release sheet 17A and the upper surface of lower release sheet 17B for the purpose of easing the separation from respective adhesive layers 6A, 6B, the operation of attaching spacer 15 may become much easier. Namely, if lower release sheet 17B is to be removed first, its peel strength is made to be weaker than that of upper release sheet 17A. By so doing, spacer 15 stays sticking to upper release sheet 17A during separation of lower release sheet 17B, as shown in FIG. 4A; spacer 15 never goes with lower release sheet 17B whose peel strength is weaker. Thus, the operation of separating lower release sheet 17B is easy.

Figure 4C:
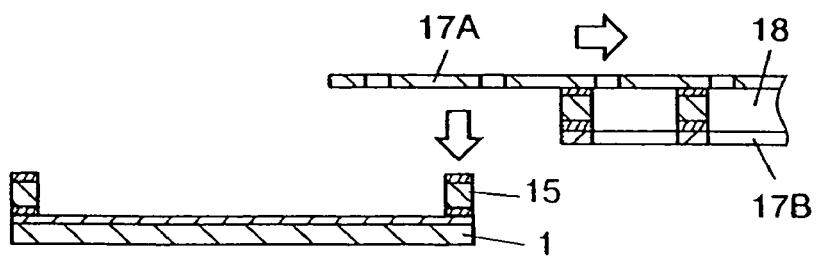

Then, as illustrated in FIG. 4C, either spacer sheet 18 or lower substrate 1 is revolved and adjusted to a certain specific positioning. Next, lower release sheet 17B is stripped of the next spacer 15. The next spacer 15 is attached on lower substrate 1 at the upper surface along the right-to-top circumferential sides.

Figure 4D:
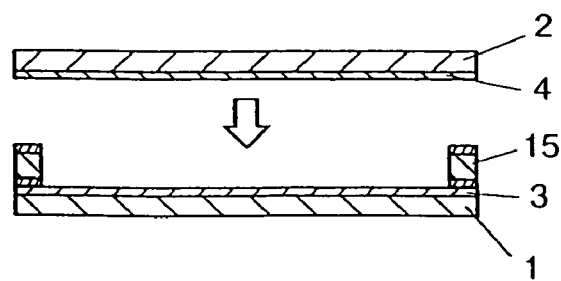
Figure 5:
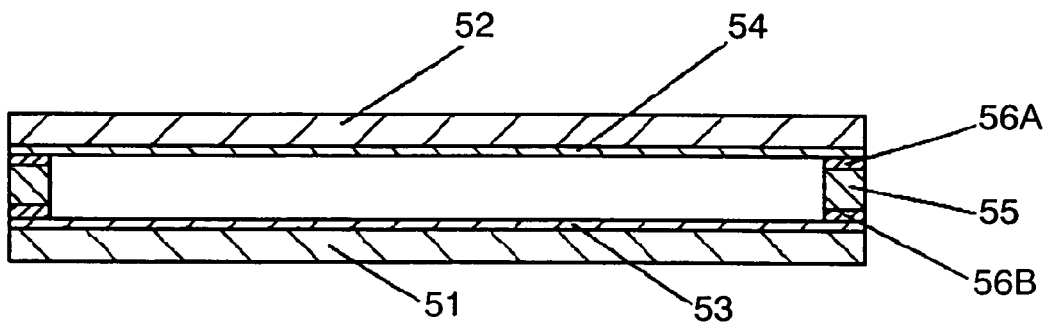
FIG. 5 is a cross sectional view of a conventional touch panel.
Figure 6A:
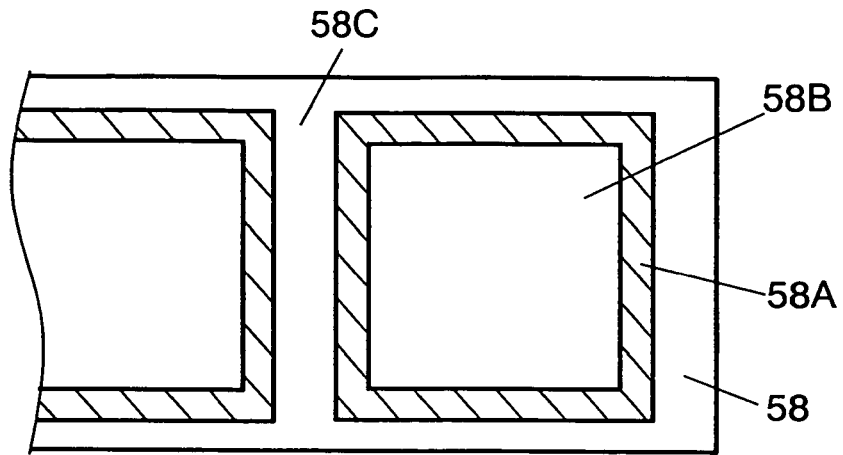
FIGS. 6A, 6B and 6C show a plan view and cross sectional views used to describe a method of manufacturing a conventional touch panel.
Figure 6B:
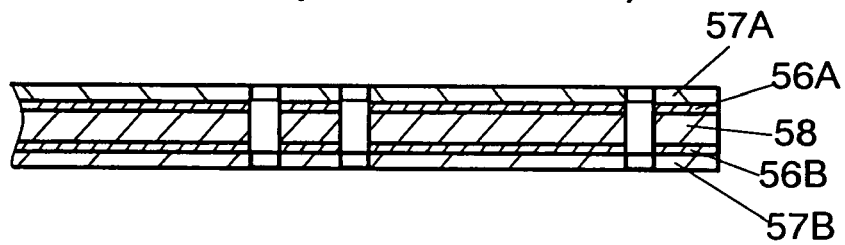
Figure 6C:
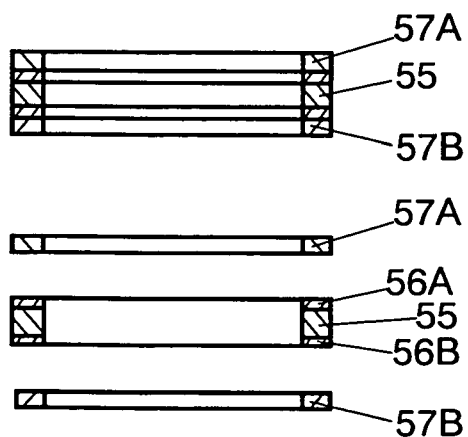

As shown in FIG. 4D, upper substrate 2 is disposed above lower substrate 1 to be glued together along the outer circumferential sides, in an arrangement where upper conductive layer 4 and lower conductive layer 3 are opposed face to face. Thus a finished touch panel as shown in FIG. 1 and FIG. 2 is completed, which touch panel including the L-shape spacer 15 for two pieces disposed in an opposing layout between upper substrate 2 and lower substrate 1. The gaps between two spacers 15 may be filled with sealing material 16 by applying and drying it either at the stage when the spacers 15 are attached on the upper surface of lower substrate 1 as shown in FIG. 4C, or after completion of a final touch panel assembly.

A completed touch panel is disposed at the front of a liquid crystal display or other display devices, and mounted integrally on an electronic apparatus. The pair of the upper and the lower electrodes is connected to an electronic circuit (not shown) of electronic apparatus.

In the above described setup, when the upper surface of upper substrate 2 is pressed down by an operator watching the display screen with a finger or a pen, upper substrate 2 is deformed bringing upper conductive layer 4 to make contact with lower conductive layer 3 at the pressed location. A certain voltage is applied to the upper electrode and to the lower electrode by the electronic circuit, and the electronic circuit acknowledges the pressed location by detecting the voltage ratio between the electrodes. In this way, an operator can switch the operation of an electronic apparatus from one function to another.

A touch panel in accordance with an embodiment of the present invention includes spacer 15 shaped in the form of a letter L. L-shape spacers 15, however, can be patterned on spacer sheet 18 densely for a substantial number in a certain specific orientation. Thus a large number of spacers can be made available out of a unit spacer sheet 18 of a certain specific size. The material loss can be reduced. The present invention is advantageous in implementing a low cost touch panel, and offers an easy method for manufacturing such touch panels.

Furthermore, the filling of gaps between the plurality of L-shape spacers with sealing material 16 is effective to protect the space formed between lower conductive layer 3 and upper conductive layer 4 from a possible intrusion of moistures and dusts. This contributes to the stability of contacts between the conductive layers.

Still further, the differentiated peel strength between upper release sheet 17A and lower release sheet 17B contributes to the ease of the operation of attaching spacer 15 to upper substrate 2 and lower substrate 1.

As described in the above, a touch panel and a method of manufacturing the touch panel in accordance with the present invention offer an advantage of providing easy-to-manufacture touch panels at low cost.

What is claimed is:

1. A touch panel comprising:
   a light transmitting lower substrate having a lower conductive layer on an upper surface thereof,
   a light transmitting upper substrate with an upper conductive layer on a lower surface thereof, a space formed between said lower conductive layer and said upper conductive layer, and
   a plurality of sheet spacers disposed between said upper conductive layer and said lower conductive layer, said spacers being provided with adhesive layers on an upper surface and a lower surface thereof;
   wherein
   the plurality of spacers are provided along sides of the upper and the lower substrates, and
   said spacers are L shaped.

2. The touch panel of claim 1, wherein a gap between the plurality of spacers is filled with a sealing material.

* * * * *